US012638082B2

(12) United States Patent
Huang et al.

(10) Patent No.: US 12,638,082 B2
(45) Date of Patent: May 26, 2026

(54) SEAL UNIT, JOINT, INDUSTRIAL DEVICE AND METHOD

(71) Applicant: ABB Schweiz AG, Baden (CH)

(72) Inventors: Jiangwei Huang, Västerås (SE); Johan Ernlund, Västerås (SE); Tomas Botold, Västerås (SE); Shanghua Li, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/836,440

(22) PCT Filed: Feb. 14, 2022

(86) PCT No.: PCT/EP2022/053475
§ 371 (c)(1),
(2) Date: Aug. 7, 2024

(87) PCT Pub. No.: WO2023/151819
PCT Pub. Date: Aug. 17, 2023

(65) Prior Publication Data
US 2025/0116336 A1 Apr. 10, 2025

(51) Int. Cl.
*B25J 19/00* (2006.01)
*F16J 15/34* (2006.01)
(52) U.S. Cl.
CPC ........... *F16J 15/34* (2013.01); *B25J 19/0075* (2013.01)
(58) Field of Classification Search
CPC ......... B25J 19/0075; F16J 15/34; F16J 15/32; F16J 15/328; F16J 15/54
See application file for complete search history.

(56) References Cited

U.S. PATENT DOCUMENTS

| | | | | | |
|---|---|---|---|---|---|
| 3,698,725 | A | * | 10/1972 | Klabunde | F16J 15/34 409/231 |
| 3,827,701 | A | * | 8/1974 | Sakamaki | F16J 15/34 277/357 |
| 3,953,150 | A | * | 4/1976 | Onal | F04D 29/0413 416/175 |

(Continued)

FOREIGN PATENT DOCUMENTS

| | | |
|---|---|---|
| CN | 102042366 A | 5/2011 |
| CN | 105459147 A | 4/2016 |

(Continued)

OTHER PUBLICATIONS

International Preliminary Report on Patentability; Application No. PCT/EP2022/053475; Issued: Aug. 20, 2024; 6 Pages.

(Continued)

*Primary Examiner* — Eugene G Byrd
(74) *Attorney, Agent, or Firm* — Whitmyer IP Group LLC

(57) ABSTRACT

A seal unit for being installed in a joint, the seal unit having a first adapting ring concentric with a seal unit axis; a dynamic seal in contact with, and allowed to slide relative to, the first adapting ring; and a holding device configured to adopt two states, at least one of the states being associated with a unique seal unit width of the seal unit along the seal unit axis; wherein the holding device is configured to hold the dynamic seal compressed against the first adapting ring in at least one of the states. A joint, an industrial device and a method of installing a seal unit are also provided.

19 Claims, 10 Drawing Sheets

(56) References Cited

U.S. PATENT DOCUMENTS

| | | | | |
|---|---|---|---|---|
| 3,967,359 | A * | 7/1976 | Davis | F01C 19/08 |
| | | | | 29/235 |
| 10,539,034 | B2 * | 1/2020 | Miller | F01D 11/003 |
| 11,333,249 | B2 * | 5/2022 | Jones | F16J 15/344 |
| 2001/0045700 | A1 | 11/2001 | Russell | |
| 2015/0167846 | A1 * | 6/2015 | Haynes | F16J 15/442 |
| | | | | 277/350 |
| 2015/0321362 | A1 * | 11/2015 | Nakanishi | B25J 19/0075 |
| | | | | 277/500 |
| 2015/0354549 | A1 * | 12/2015 | Rabhi | F16L 27/0808 |
| | | | | 417/375 |
| 2017/0051857 | A1 * | 2/2017 | Sakakura | B24B 37/34 |
| 2017/0146130 | A1 * | 5/2017 | Yanagisawa | F16J 15/3472 |
| 2020/0246981 | A1 * | 8/2020 | Matsui | B25J 19/0058 |
| 2021/0231218 | A1 * | 7/2021 | Li | F16L 27/082 |
| 2021/0245373 | A1 | 8/2021 | Huang et al. | |
| 2022/0170547 | A1 * | 6/2022 | Martini | B25J 19/0075 |

FOREIGN PATENT DOCUMENTS

| | | | |
|---|---|---|---|
| CN | 108087558 | A | 5/2018 |
| WO | 2020137605 | A1 | 7/2020 |
| WO | 2020192862 | A1 | 10/2020 |

OTHER PUBLICATIONS

International Search Report and Written Opinion of the International Searching Authority; Application No. PCT/EP2022/053475; Completed: Sep. 16, 2022; Mailing Date: Sep. 26, 2022; 12 Pages.
European Office Action; Application No. 22 713 539.9; Issued: Jun. 18, 2025; 5 Pages.

* cited by examiner

SEAL UNIT, JOINT, INDUSTRIAL DEVICE AND METHOD

TECHNICAL FIELD

The present disclosure generally relates to a seal unit comprising a dynamic seal. In particular, a seal unit for being installed in a joint, a joint comprising a seal unit, an industrial device comprising such joint, and a method of installing a seal unit in a joint, are provided.

BACKGROUND

In some processing environments, it is desirable to maintain a high level of hygiene. Examples of such processing environments include environments where food, beverages or pharmaceuticals are handled by an industrial robot. Any sanitary problem in such processing environment might result in severe consequences. For this reason, comprehensive cleaning of the robot and its surroundings is often performed on a daily basis. Typical cleaning procedures include high pressure washing with hot water containing chemical agents, such as strong acidic or alkaline detergents and disinfectants.

An industrial robot typically comprises seals between its moving parts to prevent media from an external region with respect to the robot to enter an internal region of the robot, and vice versa. When water reaches the internal region, corrosion is accelerated, and contaminants can be carried by the water to the internal region. Moreover, electronic equipment inside the robot can be damaged by water or humidity ingress. Leakage of gearboxes is also a common issue occurring in industrial robots. When the sealing solution is insufficient, a food grade lubricant might be contaminated in the internal region and pass through the seal to the external region.

WO 2020192862 A1 discloses a robot joint comprising a first robot part, a second robot part and a seal arrangement for sealing a joint gap separating the first robot part and the second robot part. The seal arrangement comprises a first side element being part of the first robot part and immobile in relation to the same, and a gap element extending across the joint gap. One of the first side element and the gap element comprises a first surface in a food grade material, and the other one of the first side element and the gap element comprises a first sealing element configured to be in sliding contact with the first surface. The first side element may be provided as a separate insert configured to be fixedly attached to a first robot interface of the first robot part. The seal arrangement may further comprise an energizing mechanism configured to increase contact pressure between the first surface and the first sealing element.

In a joint of the type in WO 2020192862 A1, it may be desired to provide a predefined preload on the gap element for best performance. Due to tolerances, an exact gap width of the joint may not be known without at least one round of dry assembly, i.e. an assembly of the joint without the gap element. One or more shims may then be selected and installed to adjust the gap width and to thereby provide the predetermined preload in the gap element. One shim may for example be positioned between the first side element and the first robot part. The addition of shims requires much effort, in particular when considering that an industrial robot may comprise several joints requiring sealing. This process is also vulnerable to human errors and is hard to implement for automated assembly. Thus, relying on shims to adjust a gap width of the joint is not an optimal solution for mass production.

CN 108087558 A discloses an underwater robot joint shaft seal comprising a static ring, a movable ring, a dynamic sealing surface and a pressing reed.

SUMMARY

One object of the invention is to provide an improved seal unit.

A further object of the invention is to provide an improved joint.

A still further object of the invention is to provide an improved industrial device.

A still further object of the invention is to provide an improved method of installing a seal unit in a joint.

These objects are achieved by the seal unit, the joint and the industrial device according to the claims, respectively.

The invention is based on the realization that a provision of a seal unit comprising integrated means for adjusting a seal unit width enables adaptation to a particular gap width without need to adjust the gap width, e.g. by means of shims.

According to a first aspect, there is provided a seal unit for being installed in a joint, the seal unit comprising a first adapting ring concentric with a seal unit axis; a dynamic seal in contact with, and allowed to slide relative to, the first adapting ring; and a holding device configured to adopt two states, at least one of the states being associated with a unique seal unit width of the seal unit along the seal unit axis; wherein the holding device is configured to hold the dynamic seal compressed against the first adapting ring in at least one of the states.

The seal unit can be delivered from a supplier as a package ready to be installed and containing a preassembled dynamic seal. During installation of the seal unit to a joint, the seal unit can be treated as a single component. By changing states of the holding device, e.g. from a delivery state to a use state, the seal unit width can change to match a predefined compression of the dynamic seal. Moreover, the seal unit enables elimination of shims when installing the seal unit to a joint. The seal unit thus enables a very efficient and reliable assembly, for example an automated assembly. In the use state, the seal unit can seal the gap of the joint.

Due to the holding device, the seal unit is inherently associated with at least one unique seal unit width. The seal unit may be inherently associated with two unique seal unit widths by means of the holding device. Alternatively, or in addition, a second seal unit width may be defined by the gap width of the joint. In any case, the dynamic seal may be compressed in each of the two states of the holding device.

When the seal unit width changes due to switching states of the holding device, the compression of the dynamic seal also changes. Thus, the holding device can change states such that a predefined preload is provided in the dynamic seal.

Since the dynamic seal is in contact with, and allowed to slide relative to, the first adapting ring, the seal unit provides at least one dynamic sealing interface. The seal unit may provide such dynamic seal interface on one or both sides of the dynamic seal.

The first adapting ring may be made of metal. The first adapting ring may be hardened, at least on a surface in contact with the dynamic seal. In use of the seal unit in a joint, the first adapting ring may be immobile with respect to a first part of the joint, i.e. fixed thereto. An interface between the first adapting ring and the first part may be sealed by means of a static seal such as an O-ring.

The dynamic seal may be elastic. The dynamic seal may be a face seal configured to seal against a substantially axial surface with respect to the seal unit axis, such as an axial surface, i.e. a surface perpendicular to the seal unit axis. A substantially axial surface may be inclined between 60° and 120°, such as between 70° and 110°, to the seal unit axis. The dynamic seal may comprise, or may be constituted by, a plastic material and/or a polymer material, such as polytetrafluoroethylene (PTFE) or fluorine rubber (FKM). The material of the dynamic seal may be a food grade material, for example according to the directives of the U.S. Food and Drug Administration (FDA). The dynamic seal may be annular and concentric with the seal unit axis.

The holding device may comprise at least one part that can be disconnected from the seal unit in order to switch the holding device between the two states. The holding device may comprise one or more engaging features and the first adapting ring and/or the dynamic seal may comprise one or more engageable features. Each engaging feature may be configured to engage a unique engageable feature. Each engaging feature may be a protrusion and each engageable feature may be a recess. According to one example, the holding device comprises two protrusions and the remainder of the seal unit comprises two recesses, each for receiving a protrusion. One of the recesses may be arranged in either the first adapting ring or in the dynamic seal.

The holding device may be configured to hold the dynamic seal compressed against the first adapting ring in a first state prior to installation of the seal unit in the joint. The first state may be referred to as a delivery state may thus be one of the two states of the holding device.

Alternatively, or in addition, the holding device may enclose the dynamic seal in the first state. In this way, the dynamic seal can be protected from scratches and contaminants prior to installation of the seal unit. The holding device may enclose the entire dynamic seal in the first state. For example, the dynamic seal may be positioned entirely axially within an axial length of the holding device.

The dynamic seal and the holding device may be at least partly positioned in a common plane transverse to the seal unit axis in at least one of the states. In this case, the holding device may be arranged either radially outside or radially inside the dynamic seal with respect to the seal unit axis.

The holding device may be connected to the first adapting ring in at least one of the states of the holding device. In this case, the holding device may be disconnected from the first adapting ring in one of the states of the holding device. Alternatively, the holding device may be connected to the first adapting ring in both states.

The dynamic seal may be arranged to be forced against the first adapting ring in each of the states of the holding device. The seal unit may further comprise a seal force device arranged to force the dynamic seal against the first adapting ring in each of the states of the holding device. The seal force device may be integrated in the dynamic seal. Alternatively, the seal force device may be provided external to the dynamic seal, such as radially inside the dynamic seal with respect to the seal unit axis. Instead of using a seal force device in addition to the dynamic seal, the elastic properties of the dynamic seal may be used to force the dynamic seal against the first adapting ring in each of the states of the holding device.

The seal unit may further comprise a second adapting ring concentric with the seal unit axis. In this case, the dynamic seal may be in contact with, and allowed to slide relative to, the second adapting ring.

The seal unit of this variant comprises two dynamic seal interfaces where the dynamic seal is allowed to slide relative to an adjacent adapting ring. The second adapting ring may be of the same type as the first adapting ring. When using the seal unit according to this variant in a joint, the second adapting ring may be secured to a second part of the joint.

In the seal unit of this variant, the first adapting ring may comprise a first recess for receiving a first protrusion of the holding device and the second adapting ring may comprise a second recess for receiving a second protrusion of the holding device.

The first adapting ring may have a larger inner diameter than an inner diameter of the second adapting ring. This enables the first adapting ring and the second adapting ring to be secured to the first part and the second part, respectively, by fasteners inserted from a single side.

In case the seal unit does not comprise the second adapting ring, the dynamic seal may be immobile with respect to the second part of the joint. In this case, the dynamic seal may comprise a seal base and a sealing part where the sealing part contacts the first adapting ring. Except for not allowing sliding relative to the dynamic seal, the seal base may be configured in the same way as the second adapting ring. The seal base and the sealing part may be integrally formed, for example of plastic, or may be formed of different materials, for example by using a plastic sealing part and a metallic seal base.

The seal unit may further comprise a separation force device, separated from the dynamic seal and arranged to force the first adapting ring in a direction relaxing the dynamic seal. The separation force device may be a spring, such as a spring comprising spring steel. Examples of separation force devices comprise a wave spring and a washer. The separation force device may be provided in addition to, or as an alternative to, the seal force device. The separation force device enables elimination of fasteners to fasten the first adapting ring to the first part.

In case the seal unit comprises the second adapting ring or the seal base, the separation force device may be positioned between the first adapting ring and the second adapting ring, or between the first adapting ring and the seal base. The separation force device may be compressed between the first adapting ring and the second adapting ring, or between the first adapting ring and the seal base, in each state of the holding device.

The seal unit may comprise a bearing having a first bearing element and a second bearing element. In this case, the first bearing element may be immobile with respect to the first adapting ring. The first bearing element may be fixed directly to the first adapting ring, for example by press fitting or gluing. Each of the first and second bearing element may be a race. In case the seal unit also comprises the separation force device, the separation force device may force the bearing into a compressed state.

In case the seal unit comprises the second adapting ring, the bearing may be positioned between the first adapting ring and the second adapting ring. In case the dynamic seal comprises the seal base, the bearing may be positioned between the first adapting ring and the seal base.

The bearing may be a rolling-element bearing. In this case, the bearing may constitute the holding device. This variant relies on the ability of the rolling-element bearing to axially expand and contract due to the play therein. In this way, the bearing can adopt two states where each state is associated with a unique seal unit width.

According to a second aspect, there is provided a joint comprising a first part and a second part rotatable relative to each other about a rotation axis; a gap between the first part and the second part; and a seal unit according to the first aspect provided in the gap.

In case the seal unit comprises the second adapting ring or the seal base, this component may be immobile with respect to the second part, such as fixed thereto. The seal unit axis may be concentric with the rotation axis when the seal unit is installed in the joint. The first part and the second part may be made of metal.

The gap may define a gap width. In this case, a seal unit width associated with one of the states may be defined by the gap width.

According to a third aspect, there is provided an industrial device comprising a joint according to the second aspect. The industrial device may be an industrial robot. In this case, the first part and the second part may be a first link and a second link, respectively, of a manipulator of the industrial robot. The manipulator may comprise at least two joints, such as six or seven joints.

According to a fourth aspect, there is provided a method of installing a seal unit in a joint, the method comprising providing a joint comprising a first part and a second part rotatable relative to each other about a rotation axis; providing a seal unit comprising a first adapting ring concentric with a seal unit axis, a dynamic seal in contact with, and allowed to slide relative to, the first adapting ring; and adjusting, by means of the seal unit, a seal unit width on a basis of a predefined preload in the dynamic seal.

In contrast to using shims, which can be considered as adjusting the gap width, the present invention proposes adjusting the seal unit width by means of the seal unit itself, such as to provide the predefined preload. This implies that the seal unit comprises integrated means for adjusting its width. As an example, such integrated means may comprise the first adapting ring that has a particular adapting ring width. In other words, the first adapting ring, and thereby also the complete seal unit, may be available in a plurality of seal unit widths, and in the context of the present disclosure "adjusting the seal unit width" may involve selecting an appropriate seal unit among a plurality of seal units having different seal unit widths. The adjustment typically occurs within the range of 0 to 0.2 mm.

Alternatively, the seal unit width can be adjusted by installing the first adapting ring to the first part by means of a relatively fine thread about the seal unit axis such that turning the first adapting ring in relation to the first part displaces the first adapting ring in the direction of the seal unit axis. In contrast to a method comprising a step of selecting an appropriate seal unit width, this embodiment enables continuous rather than incremental adjustment of the seal unit width. Moreover, all the seal units for a given joint may be identical i.e. of identical seal unit widths when not in use. An additional advantage of this embodiment is that it enables adjustment after installation and thereby a dry assembly step to be omitted.

It is to be understood that adjusting the seal unit width by displacing the first adapting ring in relation to the first part affects the clearance in the interface between the two. However, as the adjustment typically is only up to 0.2 mm, which is well within the tolerance of an appropriately selected static seal between the first adapting ring and the first part, the adjustment does not significantly affect the sealing performance of the static seal. For the dynamic seal, however, an adjustment up to 0.2 mm significantly affects the preload and thereby the sealing performance of the same.

The method may comprise providing a seal unit of any type according to the first aspect and/or providing a joint of any type according to the second aspect. The seal unit provided in the method may or may not comprise a holding device according to the first aspect.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
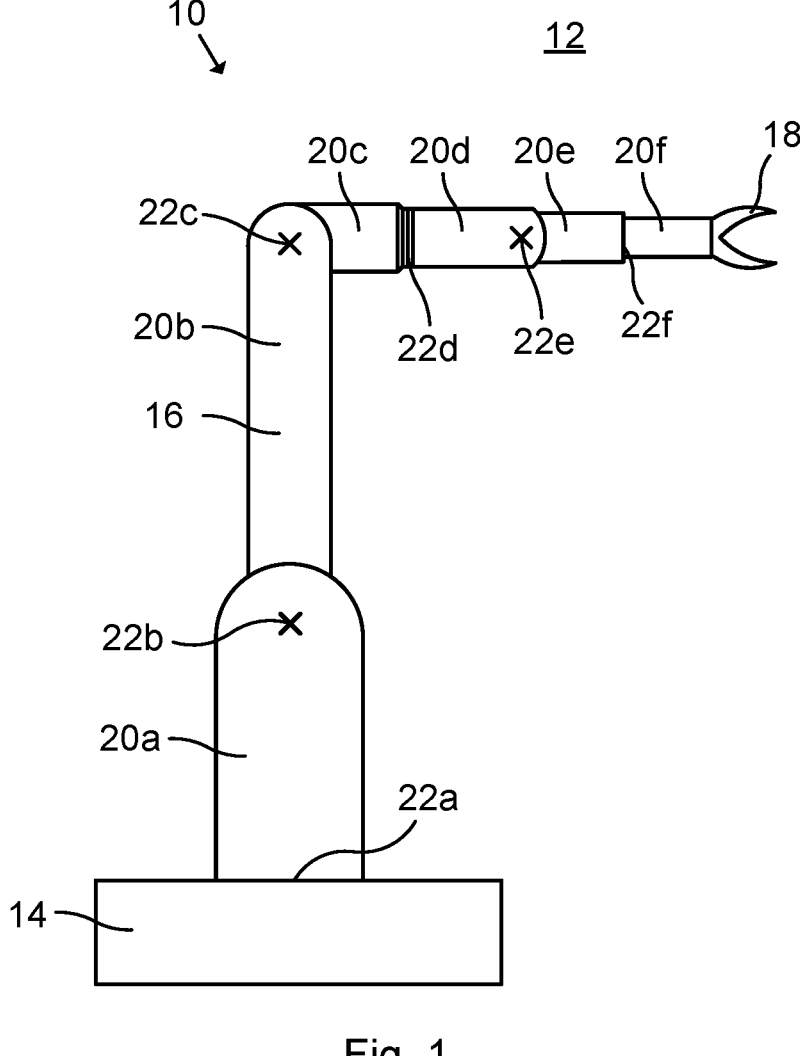
FIG. 1: schematically represents a side view of an industrial robot comprising a plurality of joints.

In the following, a seal unit for being installed in a joint, a joint comprising a seal unit, an industrial device comprising such joint, and a method of installing a seal unit in a joint, will be described. The same or similar reference numerals will be used to denote the same or similar structural features.

FIG. 1 schematically represents a side view of an industrial device, here exemplified as an industrial robot 10. The industrial robot 10 is a hygienic robot that can be used in the food and beverage industry and can withstand harsh washdown processes. The industrial robot 10 is exemplified as a six-axis industrial robot but the present disclosure is not limited to this type of industrial device. FIG. 1 further shows an external region 12 outside the industrial robot 10.

The industrial robot 10 of this example comprises a base member 14, a manipulator 16 movable relative to the base member 14, and an end effector 18 at a distal end of the manipulator 16. The manipulator 16 of this specific example comprises a first link 20a distal of the base member 14 and rotatable around a vertical axis relative to the base member 14 at a first joint 22a, a second link 20b distal of the first link 20a and rotatable around a horizontal axis relative to the first link 20a at a second joint 22b, a third link 20c distal of the second link 20b and rotatable around a horizontal axis relative to the second link 20b at a third joint 22c, a fourth link 20d distal of the third link 20c and rotatable relative to the third link 20c at a fourth joint 22d, a fifth link 20e distal of the fourth link 20d and rotatable relative to the fourth link 20d at a fifth joint 22e, and a sixth link 20f distal of the fifth link 20e and rotatable relative to the fifth link 20e at a sixth joint 22f. The sixth link 20f comprises an interface (not denoted) to which the end effector 18 is attached. The industrial robot 10 comprises an electric motor and a gearbox (not shown) for driving each joint 22a-22f.

Figure 2A:
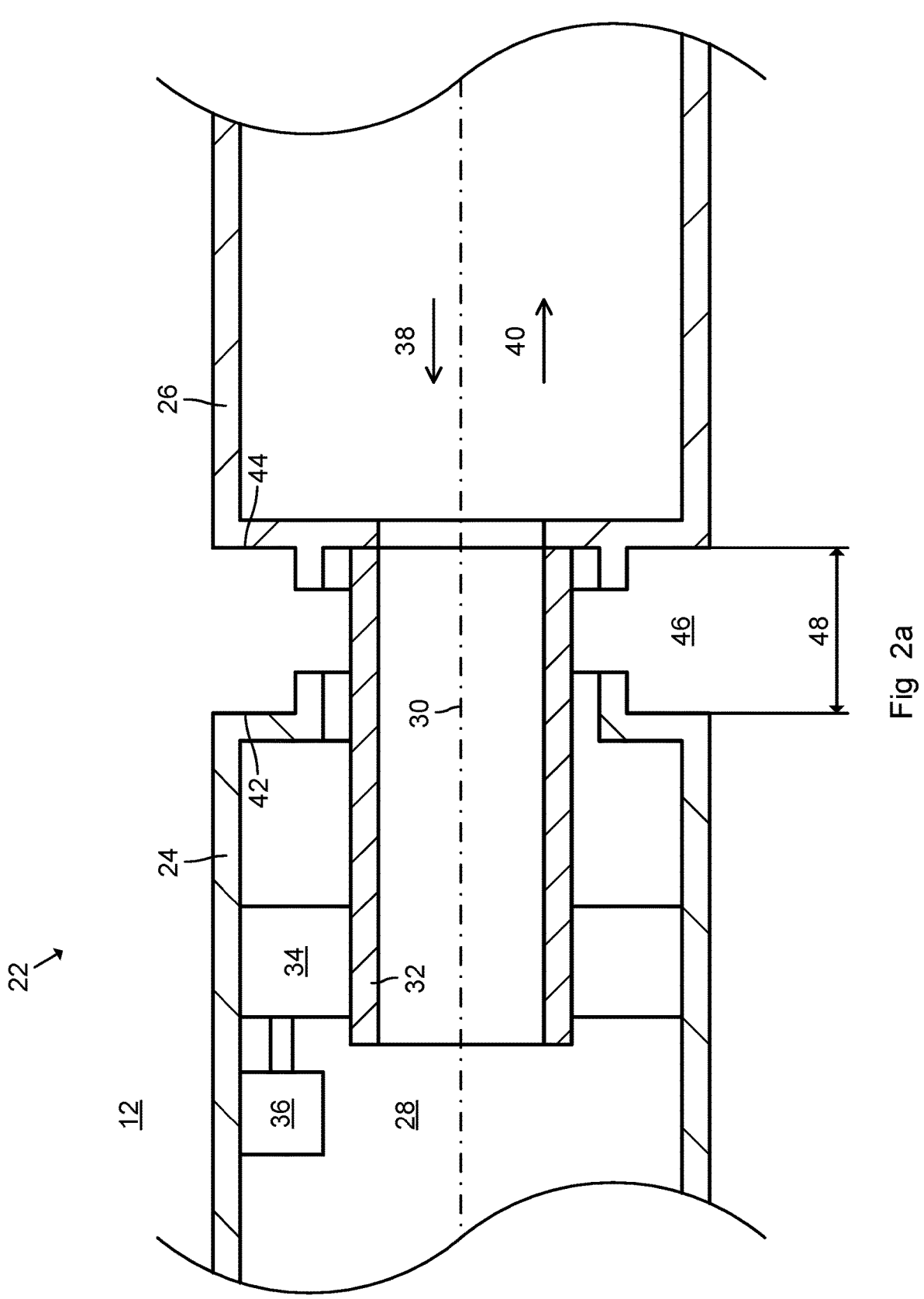
FIG. 2a: schematically represents a partial cross-sectional side view of one of the joints comprising a first part and a second part.

FIG. 2a schematically represents a partial cross-sectional side view of a joint 22. The joint 22 comprises a first part 24 and a second part 26. The first part 24 and the second part 26 may be made of plastic or metal, such as stainless steel. The first part 24 and the second part 26 are here hollow and enclose an internal region 28 therein.

The second part 26 is rotatable relative to the first part 24 about a rotation axis 30. Unless otherwise indicated, a radial direction and an axial direction refer to a radial direction with respect to the rotation axis 30 and an axial direction parallel with the rotation axis 30, respectively.

In this non-limiting and illustrative example, the joint 22, the first part 24 and the second part 26 correspond to the fourth joint 22d, the third link 20c and the fourth link 20d, respectively, in FIG. 1. The joint 22 may however constitute any of the joints 22a-22f of the industrial robot 10.

As shown in FIG. 2a, the joint 22 further comprises an output member 32. The output member 32 is fixed to the second part 26, e.g. by bolts (not shown). The output member 32 is partly accommodated inside the first part 24. The joint 22 of this example further comprises a transmission 34 and an electric motor 36. The motor 36 is arranged to rotationally drive the output member 32 via the transmission 34.

FIG. 2a further shows a first direction 38 and a second direction 40 of the joint 22. In this example, the first direction 38 is a proximal direction and the second direction 40 is a distal direction with respect to the manipulator 16.

The first part 24 comprises a first part surface 42 and the second part 26 comprises a second part surface 44. In this example, each of the first part surface 42 and the second part surface 44 is transverse to the rotation axis 30 and encloses the output member 32. An axial gap 46 having a gap width 48 is formed between the first part surface 42 and the second part surface 44. FIG. 2a shows an optional dry assembly of the joint 22 without any seal unit. After the dry assembly, the gap width 48 can optionally be measured, either automatically or manually.

Figure 2B:
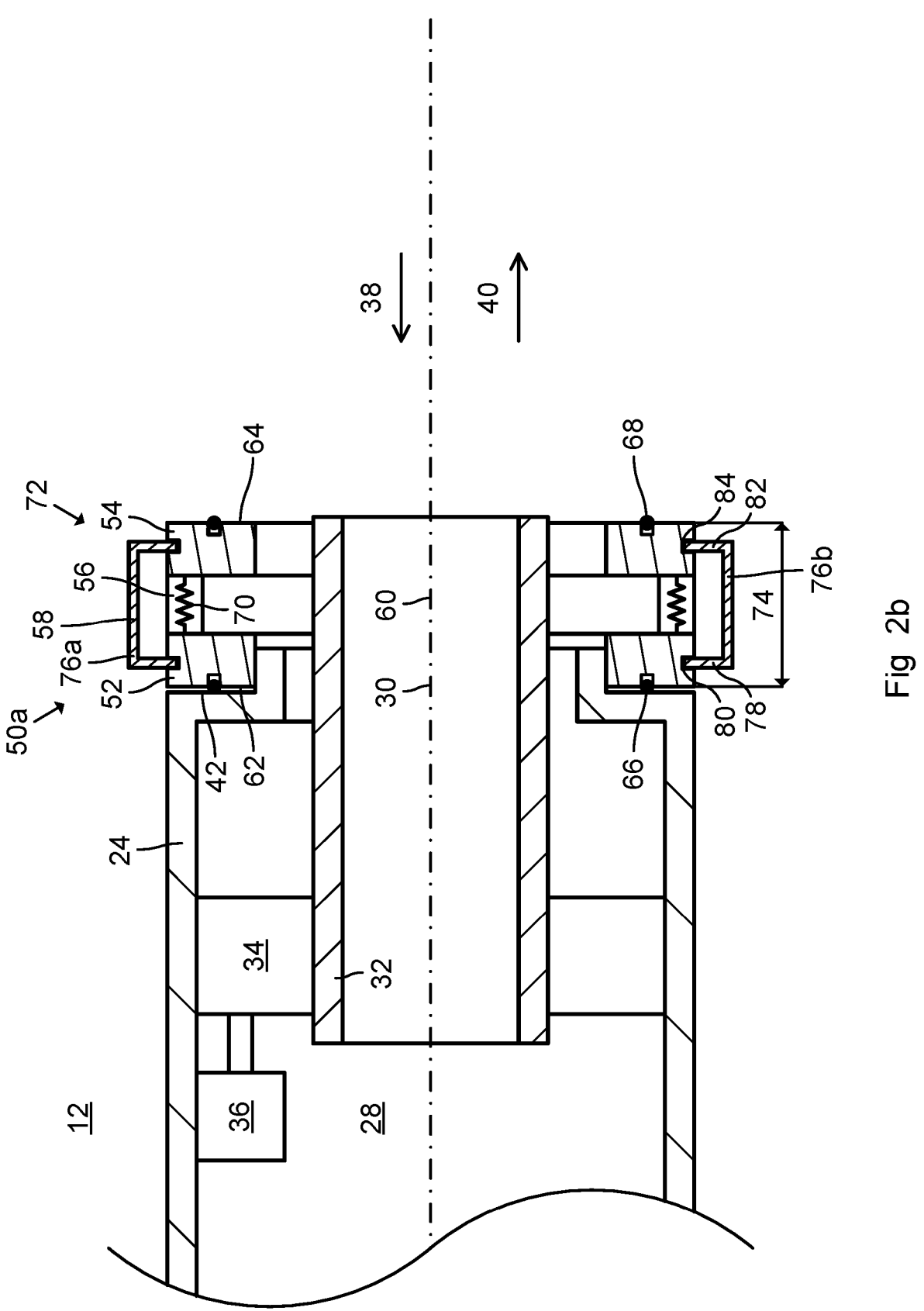
FIG. 2b: schematically represents a partial cross-sectional side view of the first part and one example of a seal unit.

FIG. 2b schematically represents a partial cross-sectional side view of the first part 24 and one example of a seal unit 50a. In FIG. 2b, the second part 26 is not connected to the first part 24 and the seal unit 50a is installed to the first part 24 as a single component.

The seal unit 50a of this example is a preassembled package and comprises a first adapting ring 52, a second adapting ring 54, an elastic dynamic seal 56 and a retaining device 58. The dynamic seal 56 is positioned between, and is in contact with, the first and second adapting rings 52, 54. The dynamic seal 56 is a two-sided face seal. In use, the dynamic seal 56 is allowed to slide relative to each of the first and second adapting rings 52, 54.

The first adapting ring 52 and the second adapting ring 54 are of corresponding designs. Each of the first and second adapting rings 52, 54 is concentric with a seal unit axis 60. The first adapting ring 52 comprises a first seal unit surface 62 and the second adapting ring 54 comprises a second seal unit surface 64. In this example, each of the first and second seal unit surfaces 62, 64 is transverse to the seal unit axis 60. The first seal unit surface 62 faces in the first direction 38 and the second seal unit surface 64 faces in the second direction 40. Each of the first and second adapting rings 52, 54 may be made of hardened metal. The seal unit 50a of this example further comprises a first O-ring 66 in the first seal unit surface 62 and a second O-ring 68 in the second seal unit surface 64.

When the seal unit 50a is installed to the first part 24, the seal unit axis 60 is concentric with the rotation axis 30. Also, the dynamic seal 56 of this example is annular and concentric with the seal unit axis 60.

The seal unit 50a of this example comprises an energizer 70. The energizer 70 is one example of a seal force device according to the present disclosure.

The energizer 70 forces the dynamic seal 56 against each of the first adapting ring 52 and the second adapting ring 54. In this example, the energizer 70 is a spring integrated in the dynamic seal 56. The dynamic seal 56 may be made of plastic, for example PTFE or FKM.

The retaining device 58 is one example of a holding device according to the present disclosure. In FIG. 2b, the retaining device 58 is in a first state 72. The first state 72 may be referred to as a delivery state. In the first state 72, the retaining device 58 holds the dynamic seal 56 compressed between the first adapting ring 52 and the second adapting ring 54. The retaining device 58 thereby secures the deformation of the dynamic seal 56. When the retaining device 58 is in the first state 72 and the dynamic seal 56 is compressed to a relatively large extent, a relatively small seal unit width 74 is defined along the seal unit axis 60 between the first and second seal unit surfaces 62, 64. The first state 72 of the retaining device 58 is thereby associated with the relatively small seal unit width 74. In the first state 72, the dynamic seal 56 is pressed against each of the first and second adapting rings 52, 54.

In the first state 72, the retaining device 58 encloses the dynamic seal 56. The retaining device 58 thereby also protects the dynamic seal 56 from damage and/or contamination, e.g. during transport or handling of the seal unit 50a.

Figure 2C:
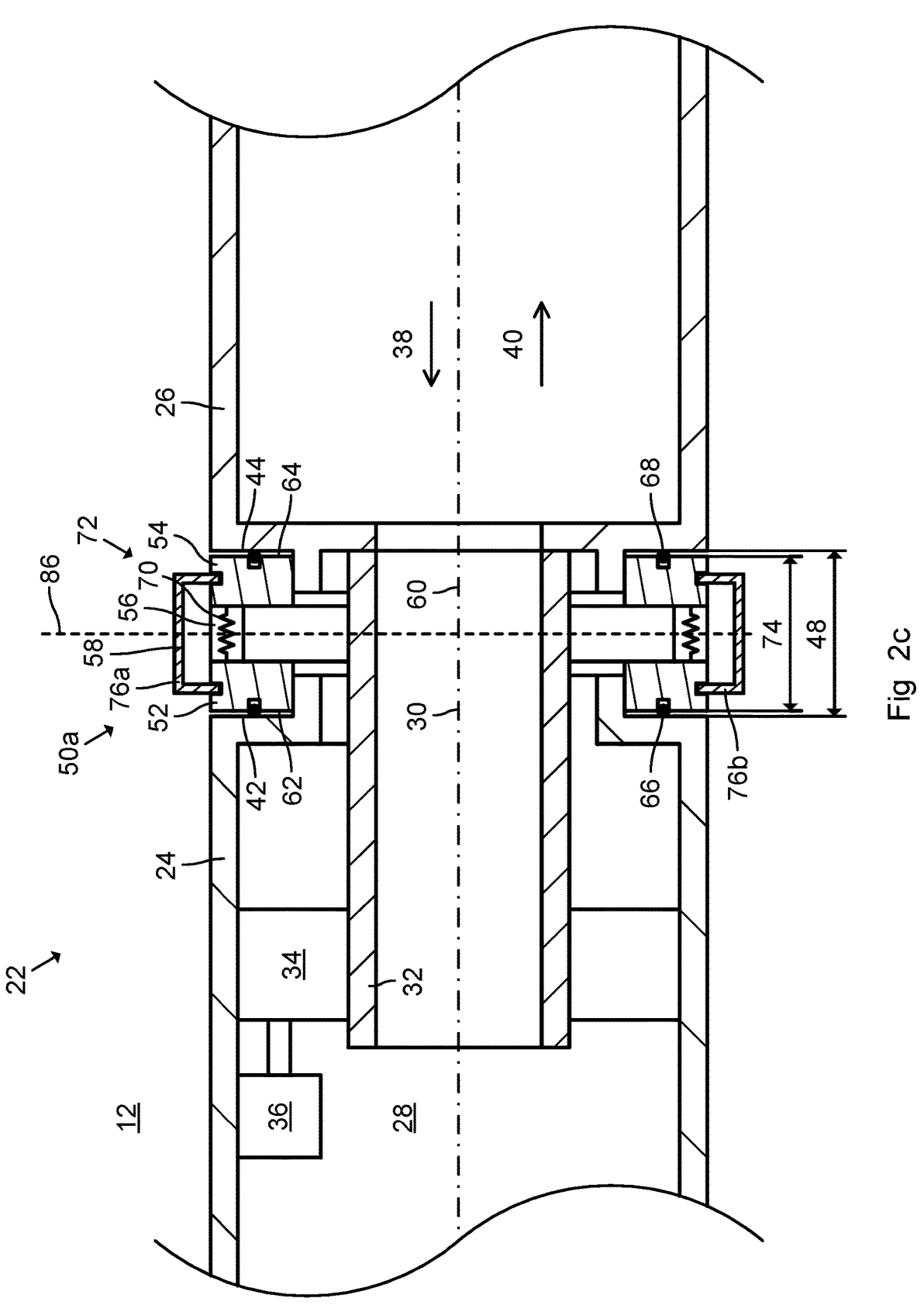
FIG. 2c: schematically represents a partial cross-sectional side view of the joint in FIG. 2a comprising the seal unit.
Figure 2D:
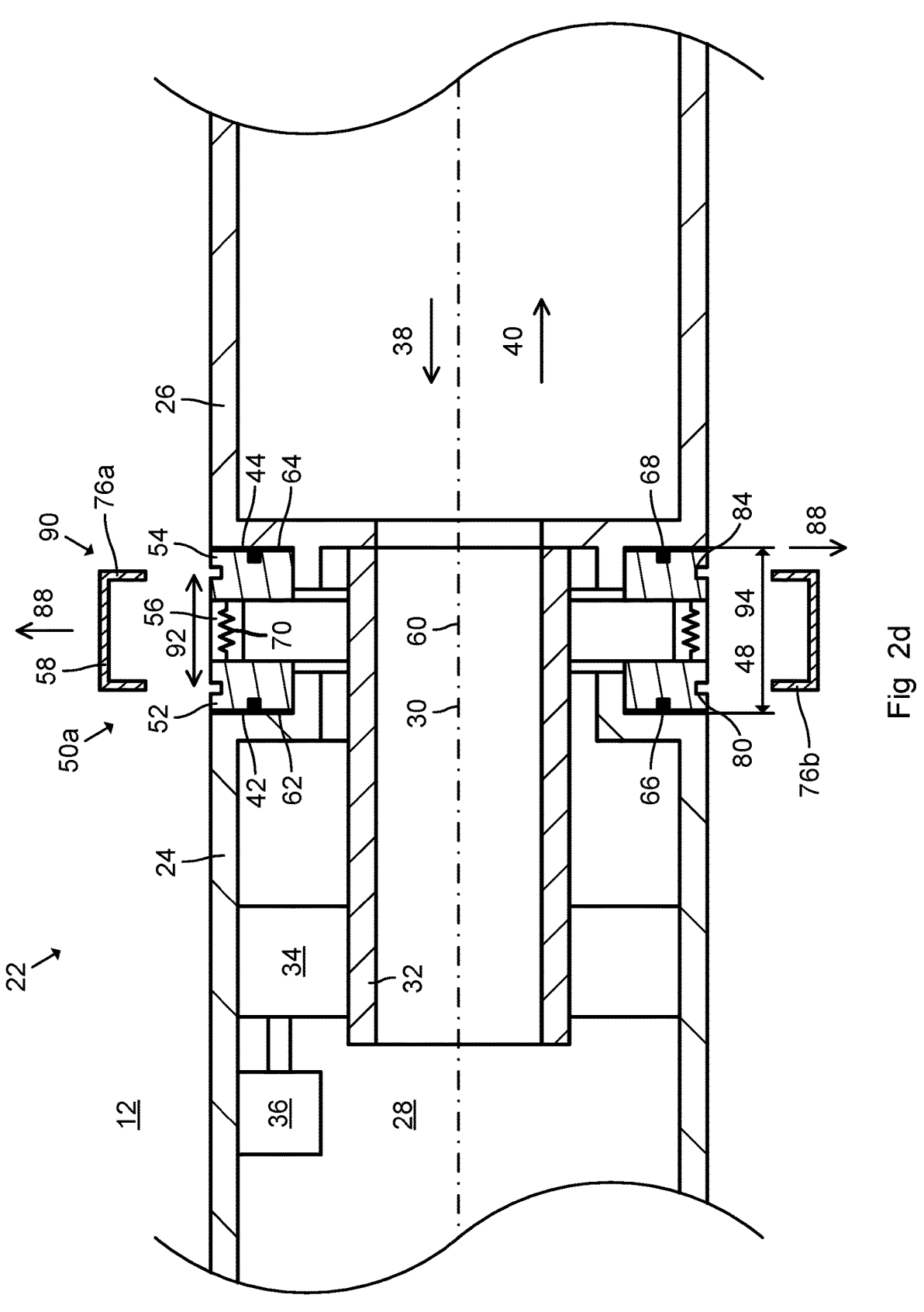
FIG. 2d: schematically represents a partial cross-sectional side view of the joint when a retaining device has been removed from the seal unit.
Figure 2E:
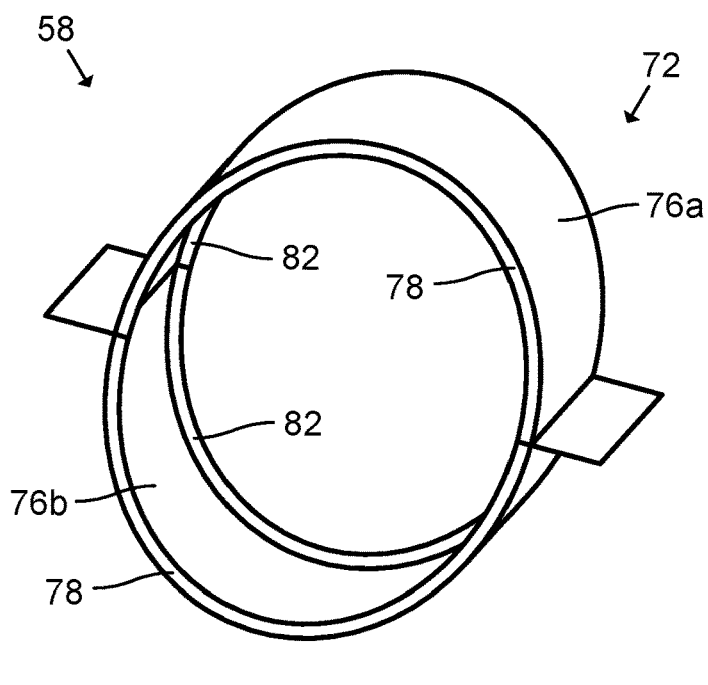
FIG. 2e: schematically represents a perspective view of one example of a retaining device in a first state.

The retaining device 58 of this specific example comprises a first retaining half 76a and a second retaining half 76b (see also FIG. 2e). Each of the first and second retaining halves 76a, 76b comprises a first protrusion 78 engaging in a first recess 80 in the first adapting ring 52 and a second protrusion 82 engaging in a second recess 84 in the second adapting ring 54.

In this way, the retaining device 58 is connected to the first and second adapting rings 52, 54 in the first state 72. The first and second retaining halves 76a, 76b may optionally also be connected to each other. The first and second protrusions 78 and 82 are examples of engaging features, and the first and second recesses 80 and 84 are examples of engageable features, according to the present disclosure.

The seal unit 50*a* is installed to the first part 24 as a single component. For example, the entire seal unit 50*a* can be moved by grabbing only one of the first and second adapting rings 52, 54. The ability of the seal unit 50*a* to be transported, stored and mounted as a single component greatly facilitates handling thereof. Prior to delivery, the supplier can properly preload the dynamic seal 56 and secure the dynamic seal 56 by the retaining device 58 in the first state 72. Quality checks of the seal unit 50*a* thereby fall under the supplier's responsibility.

FIG. 2*c* schematically represents a partial cross-sectional side view of the joint 22 in FIG. 2*a* comprising the seal unit 50*a*. In FIG. 2*c*, the second part 26 has been fixed to the output member 32 such that the seal unit 50*a* is positioned in the gap 46. Bolts (not shown) may be used to secure the first adapting ring 52 to the first part 24 and the second adapting ring 54 to the second part 26.

The first adapting ring 52 and the second adapting ring 54 are held together by the retaining device 58 in the first state 72 such that the seal unit width 74 is slightly smaller than the gap width 48. Since the energizer 70 presses the dynamic seal 56 against each of the first adapting ring 52 and the second adapting ring 54, the dynamic seal 56 is firmly preloaded within the packaged seal unit 50*a*. In this example, the seal unit 50*a* having a particular seal unit width 74 is selected based on a predefined preload in the dynamic seal 56 and on the gap width 48 among a plurality of seal units having different seal unit widths, e.g. such that the seal unit width 74 is slightly smaller than the gap width 48. This selection constitutes one example of adjusting, by means of the seal unit 50*a*, the seal unit width 74 on a basis of a predefined preload in the dynamic seal 56.

FIG. 2*c* further shows a plane 86 transverse to the seal unit axis 60. As shown, both the dynamic seal 56 and the retaining device 58 in the first state 72 are partly positioned in this plane 86.

FIG. 2*d* schematically represents a partial cross-sectional side view of the joint 22. In FIG. 2*d*, the retaining device 58 has been disconnected from the first and second adapting rings 52, 54 and removed from the joint 22, as shown with arrows 88. The retaining device 58 thereby switches from the first state 72 to a second state 90 (see also FIG. 2*f*). The second state 90 may be referred to as a use state. Since the retaining device 58 no longer holds the dynamic seal 56 compressed, the energizer 70 causes the dynamic seal 56 to expand axially, as shown with arrow 92, such that the seal unit 50*a* adopts a relatively large seal unit width 94. The second state 90 of the retaining device 58 is thereby associated with the relatively large seal unit width 94. In this example, the seal unit width 94 is defined by the gap width 48.

In the second state 90, the first seal unit surface 62 is pushed against the first part surface 42 and the second seal unit surface 64 is pushed against the second part surface 44. Thus, by removing the retaining device 58, the seal unit width 94 corresponds to the gap width 48 without needing to insert any shims. The dynamic seal 56 is now held compressed between the first part 24 and the second part 26, but is less compressed than in FIG. 2*c*. The dynamic seal 56 now seals between the external region 12 and the internal region 28 with the predefined preload since the seal unit 50*a* having the seal unit width 74 was selected based on the gap width 48. Thus, also in the second state 90, the dynamic seal 56 is pressed against each of the first and second adapting rings 52, 54.

The first O-ring 66 seals against the first part surface 42 and the second O-ring 68 seals against the second part surface 44. The first O-ring 66 adds friction between the first adapting ring 52 and the first part 24. Correspondingly, the second O-ring 68 adds friction between the second adapting ring 54 and the second part 26. In this way, the O-rings 66 and 68 contribute to avoid sliding in these interfaces. Bolts (not shown) may optionally be used to secure the first adapting ring 52 to the first part 24 and to secure the second adapting ring 54 to the second part 26.

In case the first part 24 is provided with a first part thread and the first adapting ring 52 is provided with a first adapting ring thread threadingly engaging the first part thread, an axial position of the first adapting ring 52 relative to the first part 24 can be adjusted by rotating the first adapting ring 52 relative to the first part 24 about the seal unit axis 60. In this way, the seal unit 50*a* can compensate for tolerance variations of the gap width 48. By axially adjusting the first adapting ring 52, the dry assembly step in FIG. 2*a* can be eliminated. The first part thread may be an external thread and the first adapting ring thread may be an internal thread.

FIG. 2*e* schematically represents a perspective view of the retaining device 58 in the first state 72. In this specific example, the retaining halves 76*a*, 76*b* have the same size and shape.

Figure 2F:
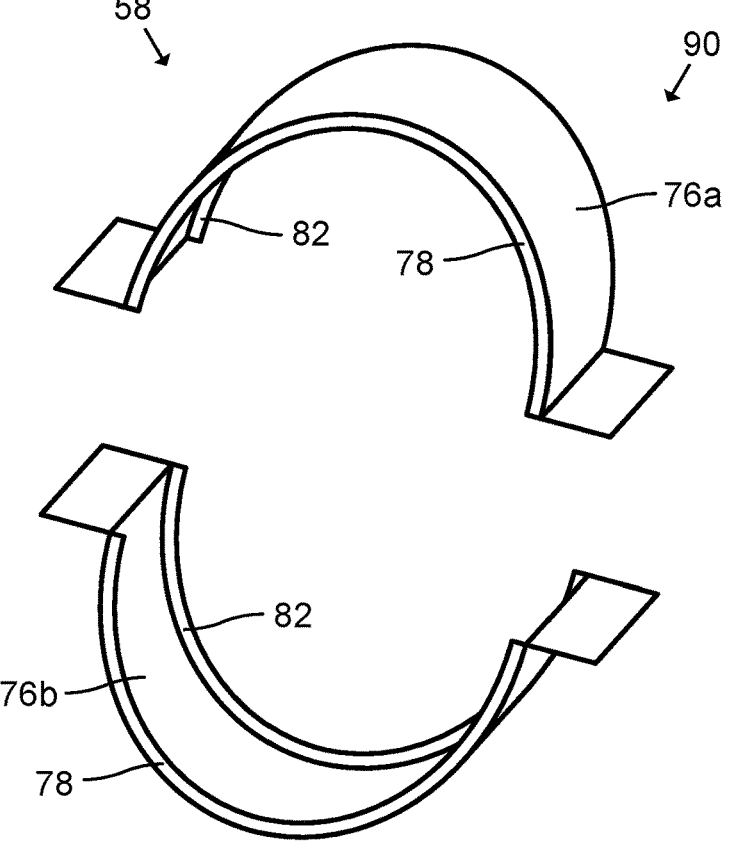
FIG. 2f: schematically represents a perspective view of the retaining device in a second state.

FIG. 2*f* schematically represents a perspective view of the retaining device 58 in the second state 90. Many alternative designs of retaining devices are however possible. The retaining device may for example alternatively comprise only one piece or more than two pieces.

Figure 3A:
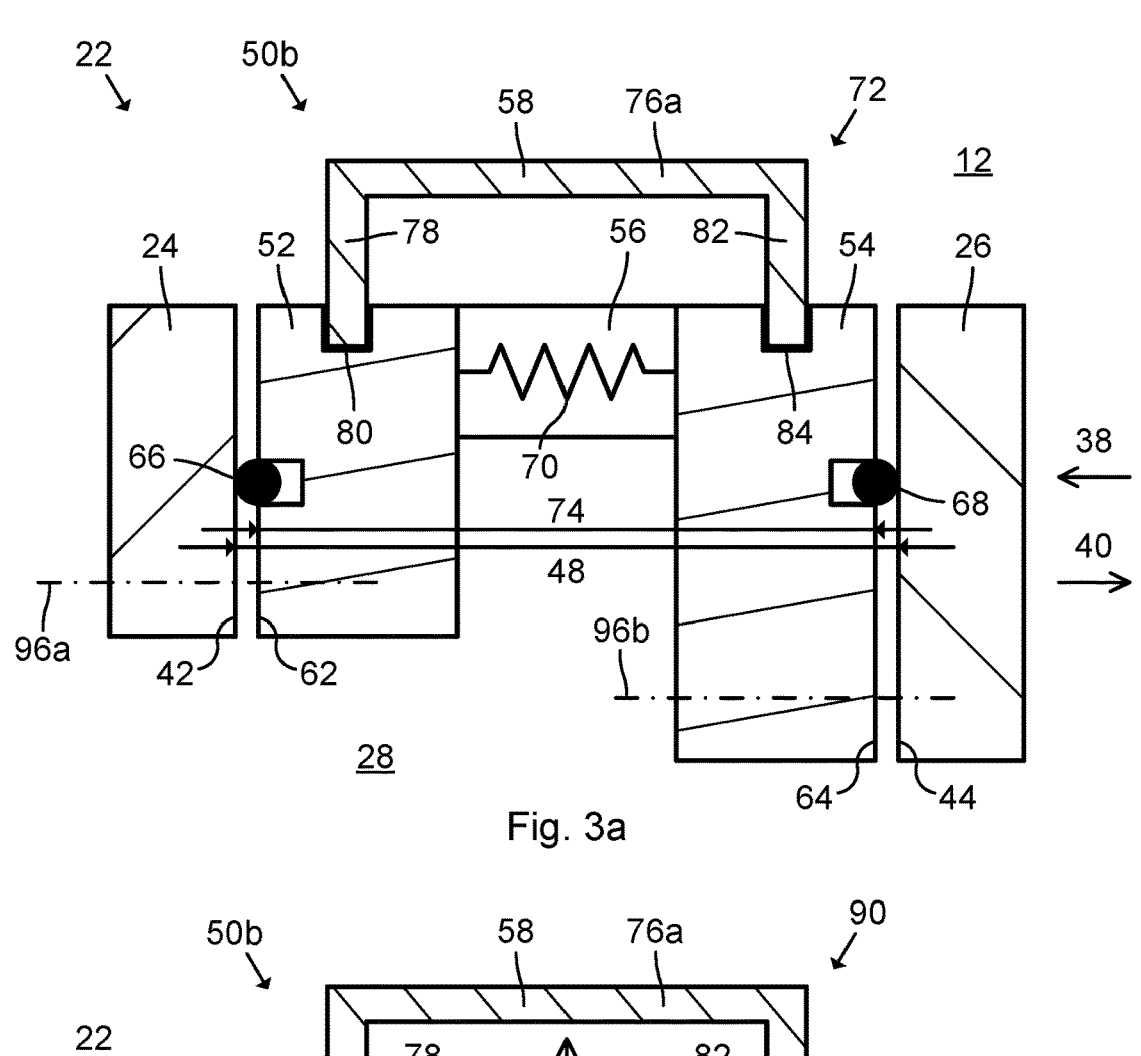
FIG. 3a: schematically represents a partial cross-sectional side view of the joint comprising a further example of a seal unit.

FIG. 3*a* schematically represents a partial cross-sectional side view of the joint 22 comprising a further example of a seal unit 50*b*. Also, the seal unit 50*b* is preassembled with the first adapting ring 52, the second adapting ring 54, the dynamic seal 56 and the retaining device 58. The seal unit 50*b* differs from the seal unit 50*a* in that the first adapting ring 52 has a larger inner diameter than an inner diameter of the second adapting ring 54. This enables the first adapting ring 52 and the second adapting ring 54 to be secured to the first part 24 and to the second part 26, respectively, by bolts inserted from a single side, here in the second direction 40. FIG. 3*a* shows two bolt axes 96*a* and 96*b* for this purpose.

Figure 3B:
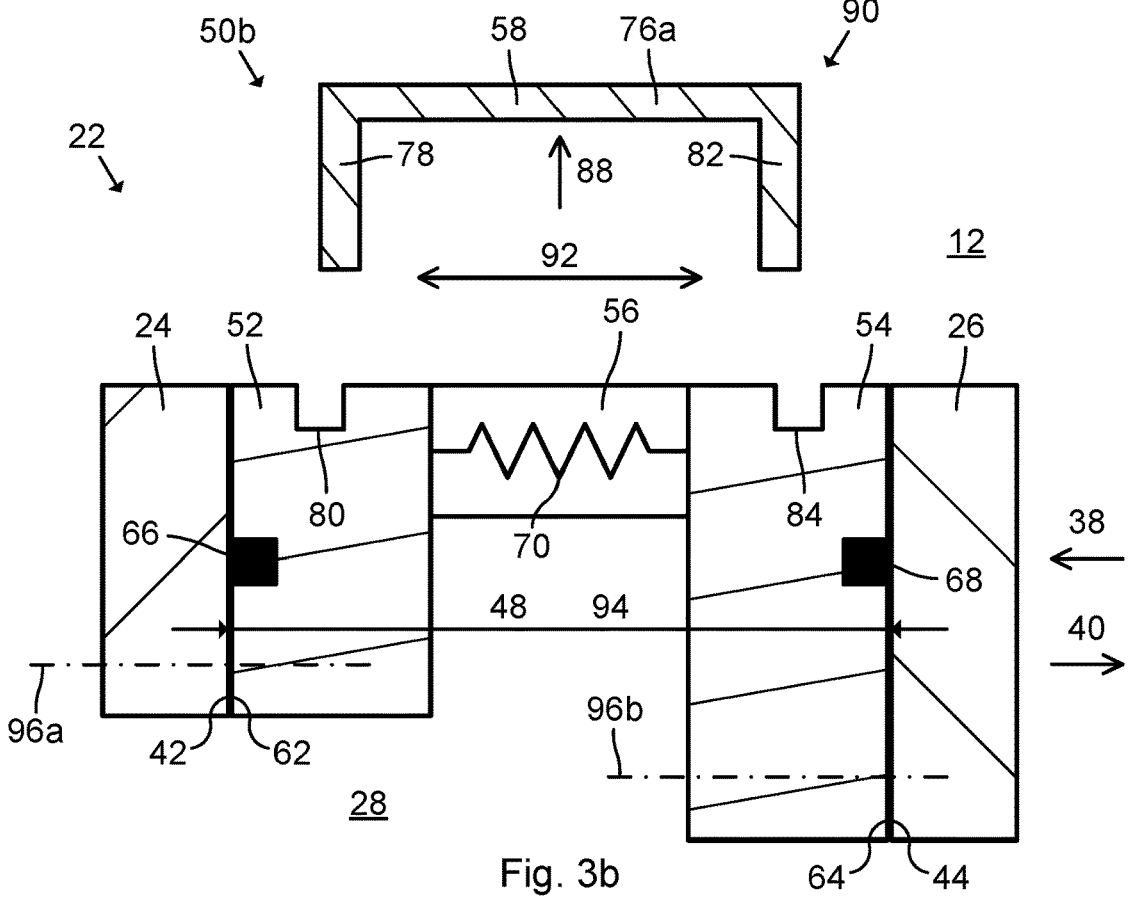
FIG. 3b: schematically represents a partial cross-sectional side view of the joint in FIG. 3a when the retaining device has been removed from the seal unit.

FIG. 3*b* schematically represents a partial cross-sectional side view of the joint 22 when the retaining device 58 has been removed from the seal unit 50*b* and thereby switched from the first state 72 to the second state 90.

Figure 4A:
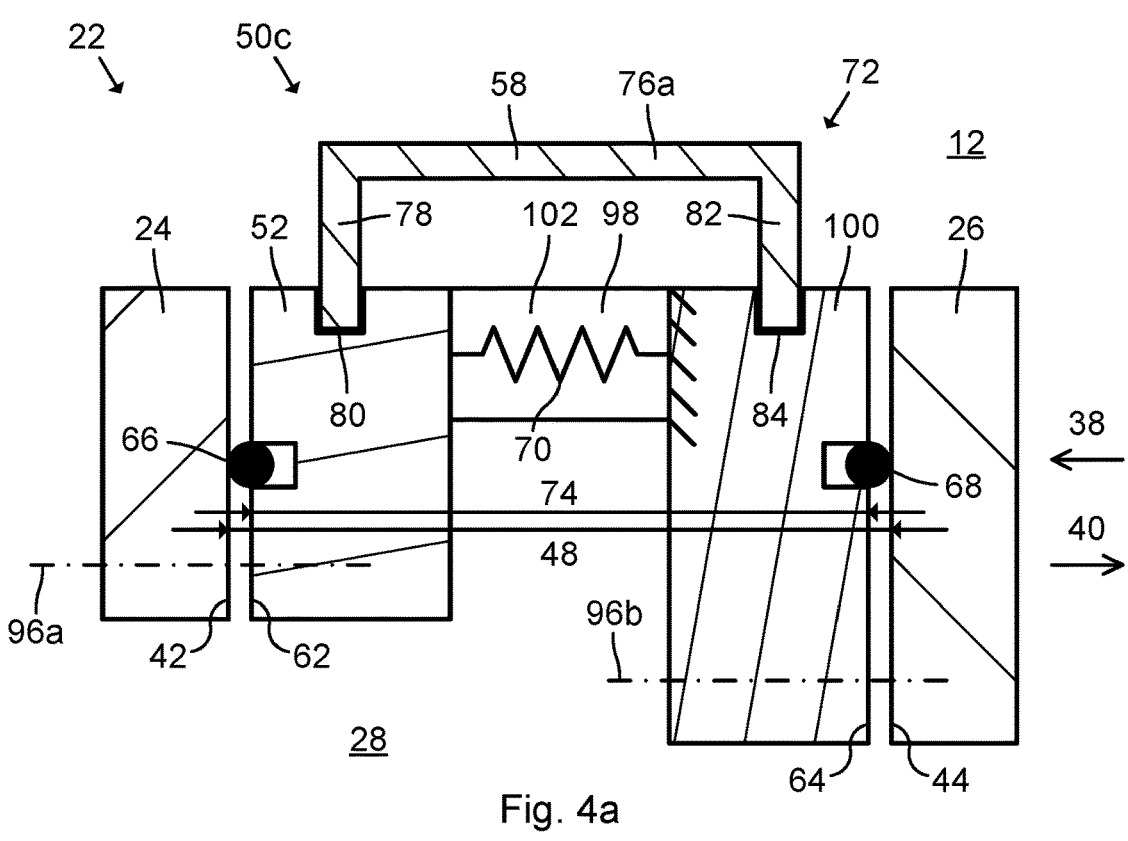
FIG. 4a: schematically represents a partial cross-sectional side view of the joint comprising a further example of a seal unit.

FIG. 4*a* schematically represents a partial cross-sectional side view of the joint 22 comprising a further example of a seal unit 50*c*. The seal unit 50*c* is preassembled with the first adapting ring 52, an elastic dynamic seal 98 and the retaining device 58. Thus, in contrast to the seal units 50*a*, 50*b*, the seal unit 50*c* does not comprise the second adapting ring 54.

The dynamic seal 98 of this specific example comprises a seal base 100 and a sealing part 102. The seal base 100 is annular and is here made of metal. The seal base 100 is of the same design as the second adapting ring 54 in the seal unit 50*b*. The sealing part 102 is of the same design as the dynamic seal 56 in the seal units 50*a*, 50*b*. However, the sealing part 102 is fixed to the seal base 100, for example by bonding. The dynamic seal 98 is thus a one-sided face seal. As shown in FIG. 4*a*, the second recess 84 receiving the second protrusion 82 is provided in the seal base 100.

Figure 4B:
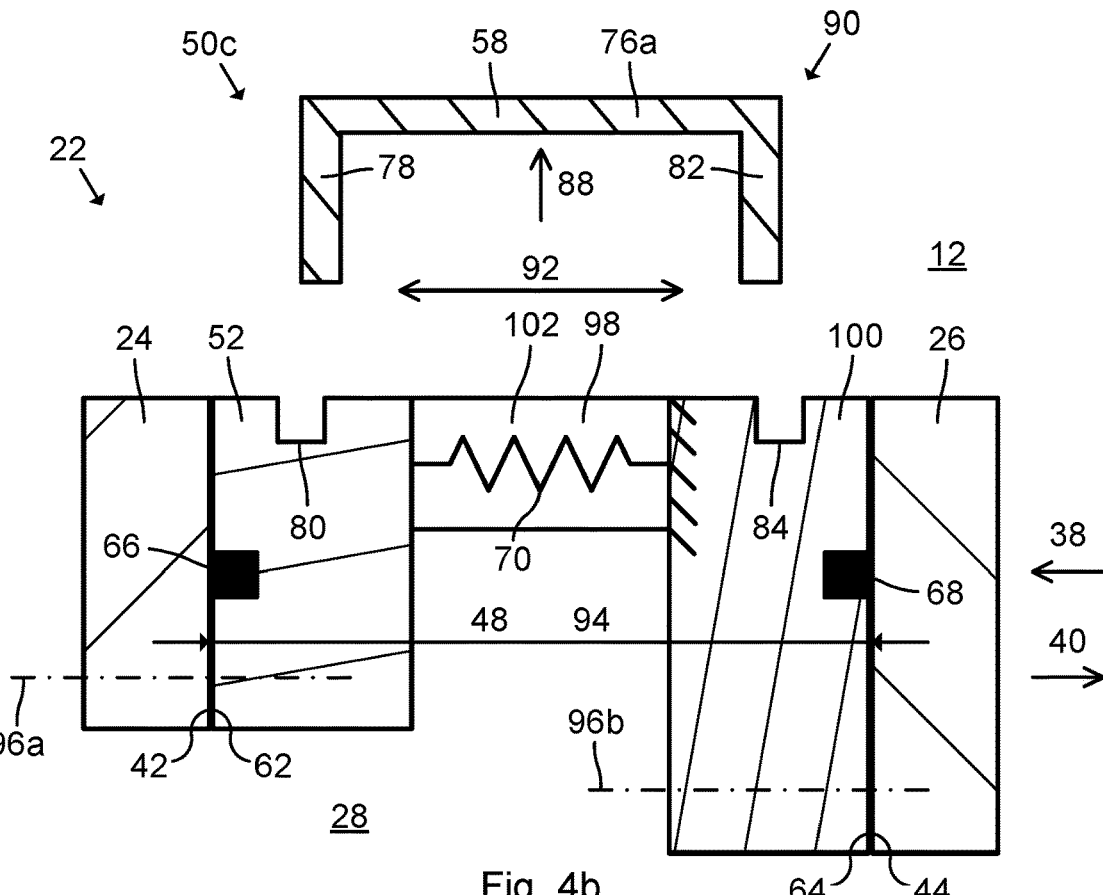
FIG. 4b: schematically represents a partial cross-sectional side view of the joint in FIG. 4a when the retaining device has been removed from the seal unit.

FIG. 4*b* schematically represents a partial cross-sectional side view of the joint 22 when the retaining device 58 has been removed from the seal unit 50*c* and thereby switched from the first state 72 to the second state 90.

Figures 5A, 5B:
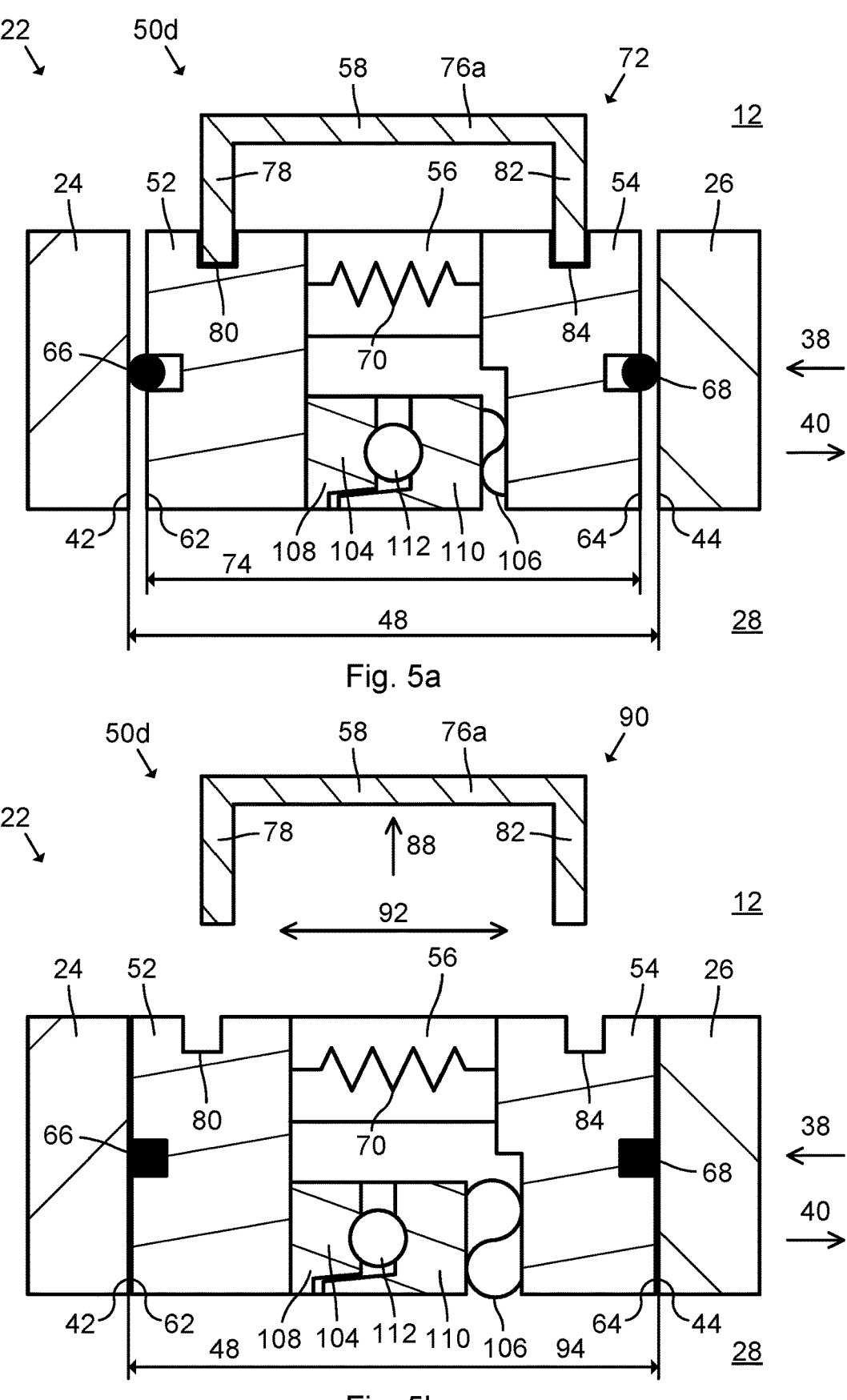
FIG. 5a: schematically represents a partial cross-sectional side view of the joint comprising a further example of a seal unit.
FIG. 5b: schematically represents a partial cross-sectional side view of the joint in FIG. 5a when the retaining device has been removed from the seal unit.

FIG. 5*a* schematically represents a partial cross-sectional side view of the joint 22 comprising a further example of a seal unit 50*d*. Mainly differences with respect to the seal unit 50a will be described. The seal unit 50d is preassembled with the first adapting ring 52, the second adapting ring 54, the dynamic seal 56, the retaining device 58, a thrust bearing 104 and a wave spring 106.

The bearing 104 is concentric with the seal unit axis 60. The bearing 104 comprises a first race 108, a second race 110 and intermediate rolling elements 112. The first race 108 and the second race 110 are examples of a first bearing element and a second bearing element, respectively, according to the present disclosure. The rolling elements 112 may for example be balls or rollers.

The first race 108 is here fixed to the first adapting ring 52, for example by press fit or gluing. The second race 110 is rotationally fixed with respect to the second adapting ring 54 but is allowed to move axially relative to the second adapting ring 54.

The wave spring 106 is here positioned between the second race 110 and the second adapting ring 54, and radially inside of the dynamic seal 56. The wave spring 106 is arranged to force the first and second adapting rings 52, 54 axially away from each other, i.e. in directions relaxing the dynamic seal 56. In the illustrated first state 72 of the retaining device 58, the wave spring 106 is compressed. The wave spring 106 also compresses the bearing 104 and eliminates any axial play between the first and second races 108 and 110. The wave spring 106 is one example of a separation force device according to the present disclosure.

FIG. 5b schematically represents a partial cross-sectional side view of the joint 22 in FIG. 5a. The retaining device 58 has been removed from the seal unit 50d and has thereby switched from the first state 72 to the second state 90. The forces from the energizer 70 and the wave spring 106 cause the first and second adapting rings 52, 54 to move axially away from each other until the seal unit width 94 matches the gap width 48. Due to the wave spring 106, which preferably exerts a larger force in the axial direction than the dynamic seal 56, the first adapting ring 52 becomes fixed to the first part 24 and the second adapting ring 54 becomes fixed to the second part 26. No bolts are therefore needed to secure the first and second adapting rings 52, 54. The bearing 104 and the wave spring 106 may for example also be used in the seal unit 50c.

Figure 6A:
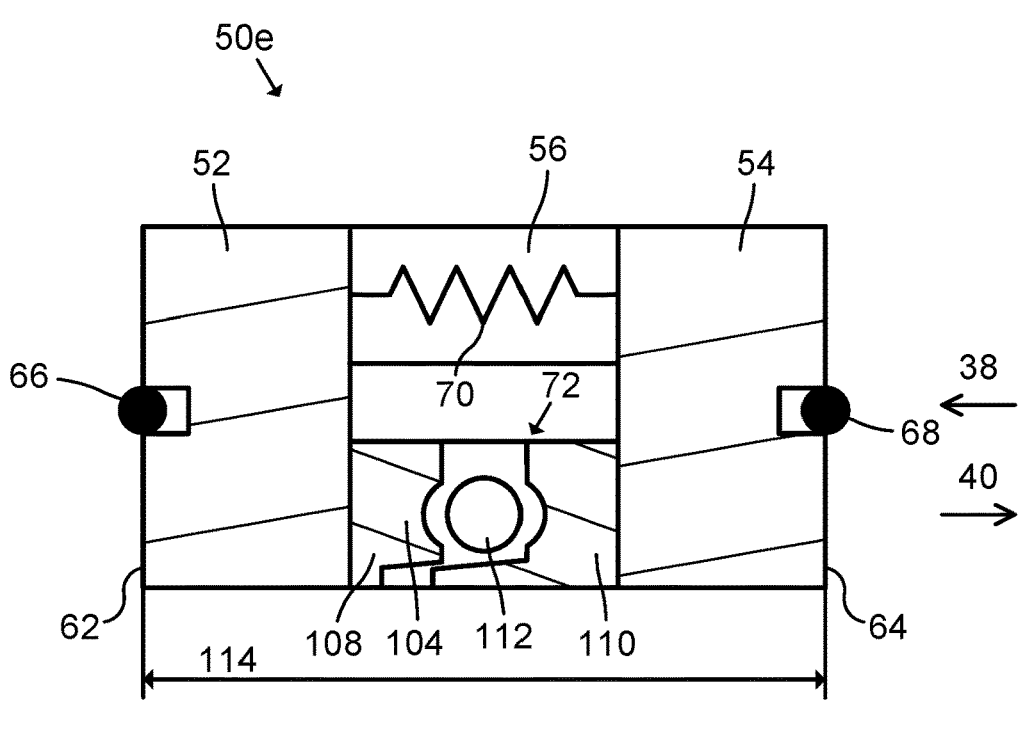
FIG. 6a: schematically represents a partial cross-sectional side view of a further example of a seal unit.

FIG. 6a schematically represents a partial cross-sectional side view of a further example of a seal unit 50e. The seal unit 50e is preassembled with the first adapting ring 52, the second adapting ring 54, the dynamic seal 56 and the bearing 104.

The seal unit 50e does not comprise the wave spring 106 or the retaining device 58. Instead, the bearing 104 functions as a further example of a holding device according to the present disclosure.

In the seal unit 50e, the first race 108 is fixed to the first adapting ring 52 and the second race 110 is fixed to the second adapting ring 54. The energizer 70 forces the first adapting ring 52 and the first race 108 axially away from the second race 110 and the second adapting ring 54. The play within the bearing 104 is thereby increased, as schematically shown in FIG. 6a. The bearing 104 thereby adopts a delivery state or first state 72. In the first state 72 of the bearing 104, the seal unit 50e adopts a relatively large seal unit width 114. The seal unit width 114 is larger than the gap width 48. In the first state 72 of the bearing 104, the dynamic seal 56 is compressed and the energizer 70 presses the dynamic seal 56 against each of the first and second adapting rings 52, 54.

Figure 6B:
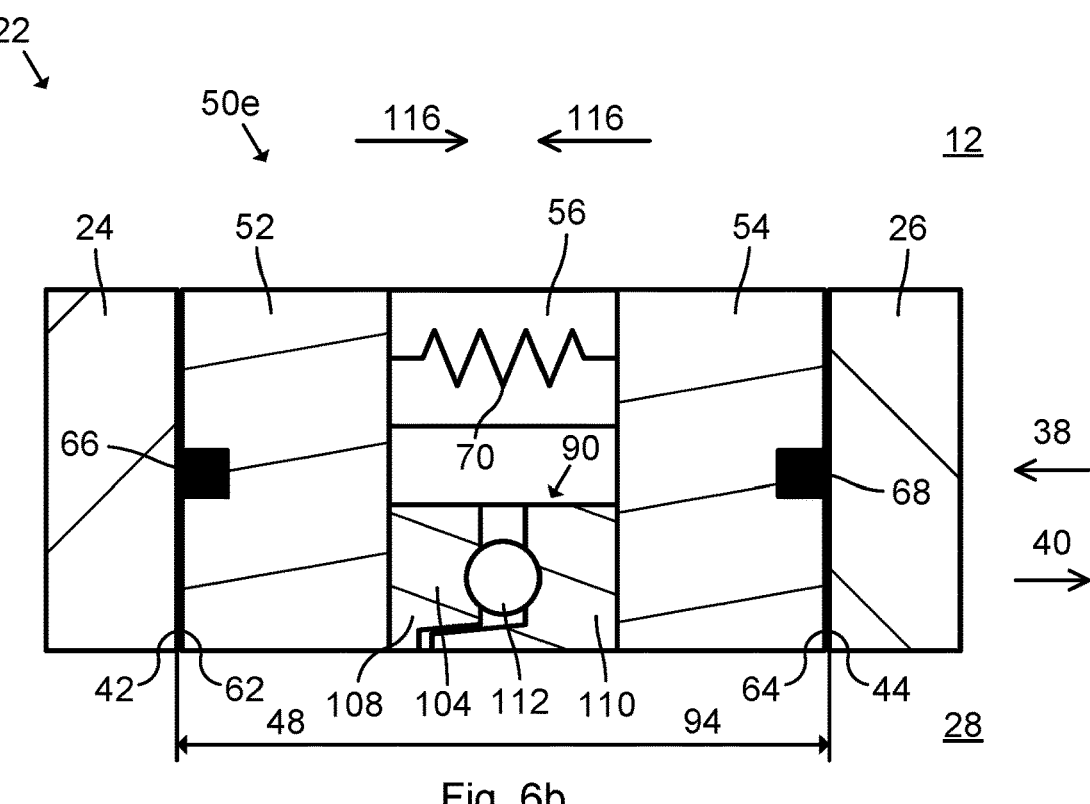
FIG. 6b: schematically represents a partial cross-sectional side view of the joint comprising the seal unit in FIG. 6a when a bearing adopts a second state.

FIG. 6b schematically represents a partial cross-sectional side view of the joint 22 comprising the seal unit 50e. In order to switch states of the bearing 104, the seal unit 50e is first installed to the first part 24. During tightening of first and second parts 24 and 26 together, the first and second adapting rings 52, 54 move axially towards each other, as shown with arrows 116, causing the bearing 104 to be compressed and the dynamic seal 56 to be further compressed. When the first and second parts 24 and 26 are tightened to define the gap width 48 therebetween, the bearing 104 switches from the first state 72 to the use state or second state 90 where the seal unit width 94 corresponds to the gap width 48. The play within the bearing 104 is now smaller than in the first state 72. Due to the first and second states 72 and 90 of the bearing 104, the bearing 104 is inherently associated with two unique seal unit widths 114 and 94. The dynamic seal 56 is pressed against each of the first and second adapting rings 52, 54 also in the second state 90 of the bearing 104.

As detailed in the foregoing, several different types of seal units 50a-50e can be fitted to the joint 22 to seal the gap 46. The seal unit 50a-50e thus has a modular design.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A seal unit for being installed in a joint, the seal unit comprising:
   a first adapting ring concentric with a seal unit axis;
   a dynamic seal in contact with, and allowed to slide relative to, the first adapting ring; and
   a holding device configured to adopt two states, at least one of the states being associated with a unique seal unit width of the seal unit along the seal unit axis;
   wherein the holding device is configured to hold the dynamic seal compressed against the first adapting ring in at least one of the states.

2. The seal unit according to claim 1, wherein the holding device is configured to hold the dynamic seal compressed against the first adapting ring in a first state prior to installation of the seal unit in the joint.

3. The seal unit according to claim 1, wherein the dynamic seal and the holding device are at least partly positioned in a common plane transverse to the seal unit axis in at least one of the states of the holding device.

4. The seal unit according to claim 1, wherein the holding device is connected to the first adapting ring in at least one of the states of the holding device.

5. The seal unit according to claim 4, wherein the holding device is disconnected from the first adapting ring in one of the states of the holding device.

6. The seal unit according to claim 1, wherein the dynamic seal is arranged to be forced against the first adapting ring in each of the states of the holding device.

7. The seal unit according to claim 6, further comprising a seal force device arranged to force the dynamic seal against the first adapting ring in each of the states of the holding device.

8. The seal unit according to claim 1, further comprising a second adapting ring concentric with the seal unit axis, wherein the dynamic seal is in contact with, and allowed to slide relative to, the second adapting ring.

9. The seal unit according to claim 1, further comprising a separation force device, separated from the dynamic seal and arranged to force the first adapting ring in a direction relaxing the dynamic seal.

10. The seal unit according to claim 1, wherein the seal unit comprises a bearing having a first bearing element and a second bearing element, and wherein the first bearing element is immobile with respect to the first adapting ring.

11. The seal unit according to claim 10, wherein the bearing is a rolling-element bearing and constitutes the holding device.

12. A joint comprising:

a first part and a second part rotatable relative to each other about a rotation axis;

a gap between the first part and the second part; and a seal unit provided in the gap, the seal unit having:

a first adapting ring concentric with a seal unit axis;

a dynamic seal in contact with, and allowed to slide relative to, the first adapting ring; and a holding device configured to adopt two states, at least one of the states being associated with a unique seal unit width of the seal unit along the seal unit axis;

wherein the holding device is configured to hold the dynamic seal compressed against the first adapting ring in at least one of the states.

13. The joint according to claim 12, wherein the gap defines a gap width, and wherein a seal unit width associated with one of the states is defined by the gap width.

14. An industrial device, such as an industrial robot, comprising:

a joint which has:

a first part and a second part rotatable relative to each other about a rotation axis;

a gap between the first part and the second part; and a seal unit provided in the gap, the seal unit having:

a first adapting ring concentric with a seal unit axis;

a dynamic seal in contact with, and allowed to slide relative to, the first adapting ring; and a holding device configured to adopt two states, at least one of the states being associated with a unique seal unit width of the seal unit along the seal unit axis;

wherein the holding device is configured to hold the dynamic seal compressed against the first adapting ring in at least one of the states.

15. A method of installing a seal unit in a joint, the method comprising:

providing a joint including a first part and a second part rotatable relative to each other about a rotation axis;

providing a seal unit including a first adapting ring concentric with a seal unit axis, a dynamic seal in contact with, and allowed to slide relative to, the first adapting ring; and adjusting, by means of the seal unit, a seal unit width on a basis of a predefined preload in the dynamic seal.

16. The seal unit according to claim 2, wherein the dynamic seal and the holding device are at least partly positioned in a common plane transverse to the seal unit axis in at least one of the states of the holding device.

17. The seal unit according to claim 2, wherein the holding device is connected to the first adapting ring in at least one of the states of the holding device.

18. The seal unit according to claim 2, wherein the dynamic seal is arranged to be forced against the first adapting ring in each of the states of the holding device.

19. The seal unit according to claim 2, further comprising a second adapting ring concentric with the seal unit axis, wherein the dynamic seal is in contact with, and allowed to slide relative to, the second adapting ring.

* * * * *